No. 736,243. PATENTED AUG. 11, 1903.
C. R. GABRIEL.
MECHANISM FOR DRIVING AND ADJUSTING ROTARY CUTTERS.
APPLICATION FILED FEB. 16, 1900.
NO MODEL.
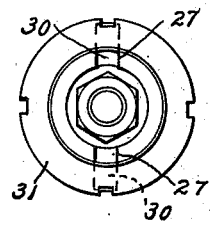
FIG. 4.
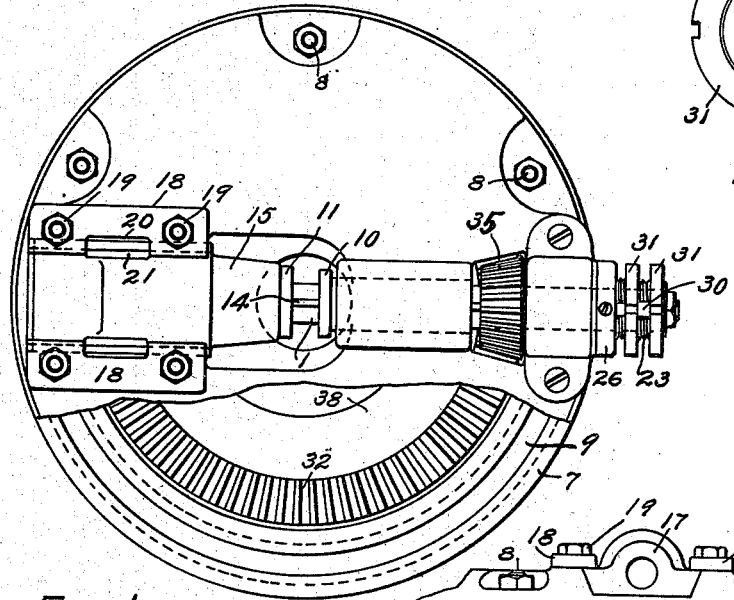
FIG. 1.
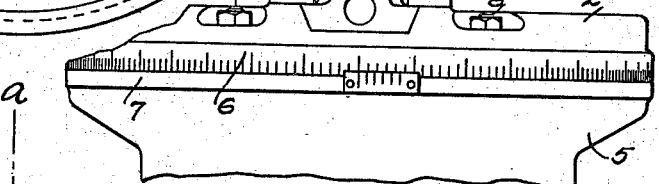
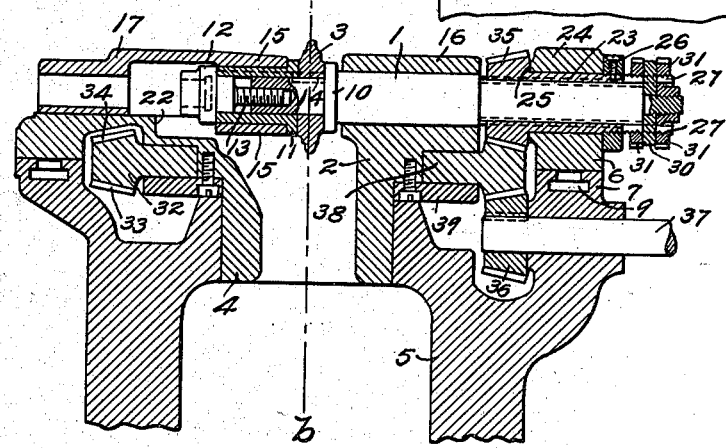
FIG. 2.
FIG. 3.
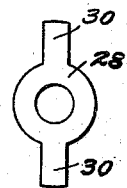
FIG. 5.
WITNESSES,
J. H. Thurston
R. A. Bates
INVENTOR,
Charles R. Gabriel
BY Wilmarth H. Thurston
ATT'Y.
THE NORRIS PETERS CO., PHOTO-LITHO., WASHINGTON, D. C.

No. 736,243. Patented August 11, 1903.

UNITED STATES PATENT OFFICE.

CHARLES R. GABRIEL, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

MECHANISM FOR DRIVING AND ADJUSTING ROTARY CUTTERS.

SPECIFICATION forming part of Letters Patent No. 736,243, dated August 11, 1903.

Original application filed December 2, 1898, Serial No. 698,095. Divided and this application filed February 16, 1900. Serial No. 5,465. (No model.)

*To all whom it may concern:*

Be it known that I, CHARLES R. GABRIEL, of Providence, county of Providence, and State of Rhode Island, have invented certain new and useful Improvements in Mechanism for Driving and Adjusting Rotary Cutters; and I do hereby declare the following specification, taken in connection with the accompanying drawings, forming a part of the same, to be a full, clear, and exact description thereof.

The invention relates more especially to and is designed more especially for use in connection with rotary cutters and cutter-spindles, although certain features of invention—as, for instance, those relating to the manner of mounting and driving the spindle—may be used with advantage in cases where the spindle does not carry a cutter, and it will be understood that those claims in which a cutter is not referred to are intended to cover the constructions set forth therein without regard to what is carried or operated by the spindle or shaft.

One object of the invention is to so mount a rotary cutter that it may be adjusted to vary its angle without altering the position of the center of the cutter, and this is accomplished by mounting the cutter-spindle for angular adjustment and securing the cutter to said spindle with its center in the axis about which the spindle is adjusted.

Further features of invention relate to a simple and efficient mechanism for rotating a spindle or shaft which is angularly adjustable in the plane of its axis. In the preferred construction embodying these features of invention the adjustable spindle or shaft is driven through an intermediate rotary member having two annular surfaces or faces, one of which engages a rotary member connected with the spindle and the other of which engages a rotary driving member. The intermediate rotary member is preferably in the form of a disk or ring having two circular series of teeth, one series being engaged by a gear connected with the adjustable spindle or shaft and the other series of teeth being engaged by a gear connected with a rotary shaft mounted independently of the adjustable support which carries the adjustable spindle. The circular series of teeth may be arranged on the disk or ring as desired and may be of any desired form, but are preferably arranged on opposite sides of said ring or disk and are formed to mesh with bevel-gears which are connected with the adjustable and driving shafts, respectively, preferably by being secured directly to said shafts. The adjustable support is mounted to move about the axis of the rotary ring or disk, and when said support is turned to change the angle of the spindle the gear connected with said spindle travels around the circular set of teeth with which it meshes and may be driven through said member with equal facility whatever its angular position.

Further features of invention relate to improved means for securing a cutter to a spindle and to improved means for adjusting a cutter-spindle longitudinally.

All the features of invention may be embodied in the same structure and are so shown in the accompanying drawings, or any of said features may be used in constructions where some or all of the other features are absent.

In the accompanying drawings, in which is illustrated a construction embodying all the features of invention in their preferred form, Figure 1 is a plan view. Fig. 2 is a vertical sectional view through the axis of the cutter-spindle. Fig. 3 is an end elevation, and Figs. 4 and 5 are details of parts to be described.

Referring to the drawings in detail, the rotary shaft or spindle 1 is mounted in suitable bearings formed on or secured to a support 2, which support is mounted for angular adjustment about an axis, (indicated at $a\ b$.) A cutter 3 is secured to the spindle 1, and in order that the relative position of the center of said cutter may be maintained when the angle of the cutter is changed without the necessity of adjusting said cutter axially said cutter is secured to the spindle with its center in the axis $a\ b$, about which the spindle moves in changing the angle of the cutter. This manner of mounting the cutter constitutes one feature of the invention and is of especial importance in machines in which the cutter is to operate to cut spiral gears, as in such machines the angle between the axes of the work and cutter must be changed for gears of differing lead or diameter, and yet the center of the cutter must lie in a definite plane passing through the axis of the work. With the above construction the axis $a\,b$ may be caused to lie in the required plane, and then the angle between the axis of the cutter and the axis of the work may be varied at will by simply adjusting the spindle about said axis $a\,b$, and the center of the cutter will always remain in the required plane.

The support 2 may be mounted in any desired manner, and as shown is guided in its movement about the axis $a\,b$ by a cylindrical post or projection 4, which fits and turns within a bearing formed in the frame or support 5. As shown, the support 2 is circular and is provided with an annular bearing surface or ring 6, which engages a similar surface or ring 7, formed on the support 5. The support 2 is secured in position upon the frame 5 by means of bolts 8, the heads of which fit within an undercut groove 9, formed in the ring 7. This construction allows the support 2 to be swung into any position desired by merely loosening the nuts on the bolts 8, and by tightening said nuts the support may be firmly clamped in position.

The spindle 1 may be mounted on its support in any desired manner and the cutter secured to the spindle by any suitable means, and one simple and efficient way of mounting the spindle and securing the cutter is shown which provides for the rigid support of the cutter and allows a ready removal and replacing of the cutter. As shown, the spindle is provided with a flange or collar 10, against which the side of the cutter is forced by a sleeve 11, keyed to slide on the end of the spindle and engaged by the head 12 of a bolt 13, threaded into the end of the spindle. The head of the bolt 13 is the same diameter as the sleeve 11 and is provided with a socket in which a wrench may be inserted to turn said bolt in clamping or unclamping the cutter. The cutter is prevented from turning on the spindle by means of a key 14. The sleeve when in place forms, in effect, the outer end of the spindle and fits within a bearing 15, which serves to support the spindle beyond the cutter, whereby the cutter is more rigidly supported than would otherwise be the case. The spindle is supported on the other side of the cutter in a bearing 16 on the support 2. In order that the cutter may be removed without removing the spindle, the bearing 15 is formed in a block 17, mounted to slide longitudinally of the spindle and held in position by the plates 18, which are forced down by bolts 19. The plates 18 are cut away at 20, and the sides of the block 17 are cut away at 21, so that when the block is moved back far enough for the end of the bearing 15 to clear the end of the sleeve 11 the bearing may be lifted vertically, the bolt 13 having first been removed. After the bearing is moved away from the end of the spindle the cutter may be readily removed and replaced or another cutter substituted. The parts may be so proportioned and arranged that the only movement which need to be given to the block 17 is a sliding movement; but with the parts proportioned as shown the bearing 15 strikes the support 2 at 22 before the block 17 has moved far enough to allow the removal of the cutter.

It is frequently desirable in machines which embody a rotary cutter to adjust the cutter axially. For instance, in the machine shown, in which the center of the cutter lies in the axis $a\,b$, it is desirable that the cutter be axially adjustable, so that when a cutter of different thickness is employed it may be adjusted to bring the center into said axis. This axial adjustment of the cutter is effected in the construction shown by a novel means which in itself embodies features of invention. The axial movement of the cutter is obtained by moving the spindle axially in the following manner: The spindle extends beyond the bearing and passes through a sleeve 23, to which it is keyed, so that said sleeve and spindle revolve together while allowing a longitudinal movement of the spindle in the sleeve. The sleeve is mounted in a bearing 24 on the support 2 and is held from longitudinal movement therein by a shoulder 25 on said sleeve, which engages one end of the bearing 24, and by a nut or collar 26 engaging the other end of the bearing. The sleeve 23 extends beyond the bearing 24 and is provided with two diametrically opposite slots 27. A yoke 28 is secured to the end of the spindle by means of a nut 29 and is provided with arms 30, extending through the slots 27, the ends of the arms lying between two nuts 31, screwed onto the sleeve 23. By turning the nuts 31 the spindle may be moved longitudinally in either direction to adjust the cutter axially, and after adjustment the spindle is securely held in its adjusted relation.

So far as the feature of invention relating to the mounting of the cutter with its center in the axis about which it is adjusted is broadly concerned any suitable mechanism may be used for driving the cutter-spindle in any of its adjusted positions. It is preferred, however, to employ for this purpose a novel form of mechanism which embodies certain further features of invention and which may be employed with advantage in other constructions where it is desired to rotate a shaft in various angular positions. When employing this feature of invention, the spindle or shaft is rotated through a disk or ring mounted to rotate in a plane parallel to the axis of the adjustable spindle or shaft and having two annular faces, one of which faces engages a rotary member adjustable with the spindle about the axis of said disk or ring and connected with said spindle and the other of which faces is engaged by a rotary member mounted independently of the support which carries the adjustable spindle. The rotary member which is connected with the adjustable shaft or spindle may be connected therewith through shafts and gearing or other devices or may be and preferably is connected therewith by being secured directly to said spindle. The preferred form of this mechanism is that shown in the drawings, in which the disk or ring 32 is provided on its opposite sides with annular faces 33 and 34, on which are formed circular series of bevel-teeth, the teeth on one face being engaged by a bevel-gear 35, secured to the spindle 1, and the teeth on the other face being engaged by a bevel-gear 36, secured to a parallel rotary shaft 37, mounted in the frame 5. This arrangement of the annular faces is not essential, however, nor is it essential to the broad scope of this feature of invention that the faces be provided with teeth. As shown, the ring 32 is supported to revolve in a plane parallel to the spindle 1 by an annular flange 38, extending from its inner periphery and entering an annular guideway formed in the support 2, the flange being held in said guideway by a ring 39, secured to the support 2 and forming one side of said guideway. The space within the flange 38 forms a recess or opening in the center of the ring 32, and the support 2 is provided with a recess which extends down within the opening in ring 32. The cutter may thus be arranged to turn within the opening in ring 32, enabling the ring to be brought into closer relation to the spindle than would otherwise be the case. The same result might be effected by forming a depression in the web or disk which supports the ring 32; but it is preferred to form the recess in the ring or disk by cutting away the central portion, in which case the ring or disk is supported beyond its axis of rotation. In case the post 4 and ring 32 are below the spindle 1, as shown, the opening in the support 2 below the cutter preferably extends down through the post 4 and forms a chute for the chips made by the cutter.

This application is a division of application Serial No. 698,095, filed December 2, 1898, upon which Letters Patent No. 645,082, dated March 13, 1900, issued.

What I claim as my invention, and desire to secure by Letters Patent, is—

1. The combination of a rotary gear, a cutter-spindle mounted for circular adjustment about the axis of said gear and in the plane of its own axis, a cutter secured to said spindle with its center in the axis of said gear, a gear adjustable with said spindle engaging said rotary gear and connected with said spindle.

2. The combination of a rotary ring or disk having two series of teeth, a cutter-spindle mounted for circular adjustment about the axis of said ring and in the plane of its own axis, a cutter secured to said spindle with its center in the axis of said ring or disk, a gear engaging one of the series of teeth on said ring and connected with said spindle, and a driving-gear engaging the other series of teeth on said ring.

3. The combination of a cutter-carrying spindle, a cutter and bevel-gear carried thereby, a shaft having a bevel-gear, a rotative connection or device intermediate said bevel-gears and having two circular sets of bevel-teeth, one for engagement with each of said bevel-gears, and means for holding said intermediate connection or device against movement transversely of its path of rotation.

4. The combination of a shaft provided with a bevel-gear, a support, a cutter-carrying spindle mounted in said support and having a bevel-gear, a connection or device interposed between said shaft and cutter-carrying spindle and provided at its upper and under sides with a circular series or set of teeth, said teeth engaging said bevel-gears, said connection or device presenting at its center of rotation a space in which the cutter secured to the cutter-spindle may move when in action.

5. The combination of two shafts, a tool carried by one of the shafts, a power-transmitting member having an opening to receive said tool, driving and driven elements coöperative with said power-transmitting member and connected with the respective shafts, and means for supporting the tool-carrying shaft for angular adjustment.

6. The combination of two shafts, a rotary power-transmitting member, means for supporting the power-transmitting member beyond its axis of rotation, driving and driven elements connected with said shafts and coöperative with said power-transmitting member, a tool on one of said shafts, and means for supporting the tool-carrying shaft for angular adjustment relative to the other shaft.

7. The combination of two shafts, means for supporting the same in fixed parallel relation, and one of them for angular movement relatively to its companion, a rotative power-transmitting member supported beyond its axis of rotation and having a central opening, a tool connected to said angularly-adjustable shaft and disposed in said central opening.

8. The combination of two shafts, means for supporting said shafts in fixed parallel relation, and one of them for angular adjustment in the plane of said support, a gear having sets of teeth upon its opposite faces, a pair of gears meshing with the respective sets of teeth and secured to said parallel shafts, and a tool carried by the angularly-adjustable shaft and disposed centrally of the gear having two sets of teeth.

9. The combination of a spindle or shaft angularly adjustable in the plane of its axis, a rotary ring or disk mounted for rotation in a plane parallel to the axis of said spindle or shaft and having its center in the axis about which the spindle is adjustable, two annular faces on said ring or disk, a rotary member engaging one of said faces and connected with said spindle or shaft, and a rotary member engaging the other face.

10. The combination of an angularly-adjustable spindle or shaft, a rotary member having an annular face and mounted for rotation in a plane parallel with said spindle, a rotary member secured to said spindle and engaging said annular face, a cutter secured to said spindle within the periphery of said rotary member, and a bearing for supporting said spindle between said rotary member and said cutter.

11. The combination of a cutter-spindle, a support therefor mounted for circular adjustment in a plane parallel to the axis of said spindle, a rotary member having an annular face and having its center in the axis about which said spindle turns, a rotary member secured to said spindle and engaging said annular face, a cutter secured to said spindle within the periphery of said rotary member, a bearing on said support for the spindle located between said rotary member and the cutter, and a second bearing on said support for the spindle beyond the cutter.

12. The combination of a rotary spindle or shaft, a sleeve held from longitudinal movement, one or more longitudinal slots in said sleeve, one or more arms projecting from said spindle through said slot or slots, and nuts on said sleeve engaging opposite sides of said arm or arms.

CHARLES R. GABRIEL.

Witnesses:
W. H. THURSTON,
J. H. THURSTON.